UNITED STATES PATENT OFFICE.

ELIZA ESTELLE McNAUGHTON, OF PHŒNIX, NEW YORK.

COMPOSITION FOR BLOWING SOAP-BUBBLES.

SPECIFICATION forming part of Letters Patent No. 519,923, dated May 15, 1894.

Application filed January 20, 1894. Serial No. 497,486. (No specimens.)

*To all whom it may concern:*

Be it known that I, ELIZA ESTELLE MCNAUGHTON, a citizen of the United States, residing at Phœnix, county of Oswego, and State of New York, have invented certain new and useful Improvements in Compositions for Blowing Soap-Bubbles, fully described and represented in the following specification.

The object of the invention is to produce an improved composition for blowing soap bubbles by which the life and strength of the bubble may be increased, and especially to produce a composition forming bubbles of such life and strength as to permit their practical use in playing games by blowing or tossing them with suitable devices. Various compositions have been suggested for increasing the strength of soap bubbles, but the results have been very unsatisfactory the bubbles being very little superior to the usual soap and water bubbles, and in most cases the materials used require special treatment or become inefficient when allowed to stand. I have discovered that by the use of gum, I can produce a bubble of very great life and strength which may be blown over a surface or be dropped and caught again a great many times without breaking, so as to be practically applicable in playing games, and of great value in the investigation of and instruction in physical phenomena, especially in optics, for which scientific use a suitable strong bubble has been long desired but never secured. I prefer to use gum tragacanth, either alone with soap and water, or with other suitable material, but it will be understood that other gums may be used in place of gum tragacanth. A very cheap and desirable composition is formed by the simple use of gum tragacanth in addition to the usual soap and water. Good results may be secured by mixing the soap and gum tragacanth in powdered form with cold or hot water in any suitable manner, and the composition may be sold in the form of powder, requiring only the addition of water, but it is preferable to use hot water, mix the powdered gum tragacanth therewith and then introduce the powdered soap. The proportions may be varied considerably and still the mixture form a great improvement over the ordinary soap and water mixture, but I have found that one ounce of soap and one ounce of gum tragacanth to a gallon of water makes an excellent bubble material. It will be seen that the compositions suggested have no poisonous properties, so that a child can use them with safety.

What is claimed is—

1. A bubble composition containing soap and gum, in proportions substantially as described.

2. A bubble composition containing soap and gum tragacanth, in proportions substantially as described.

3. A bubble composition containing soap, gum and water, in proportions substantially as described.

4. A bubble composition containing soap, gum tragacanth, and water, in proportions substantially as described.

In testimony whereof I have hereunto set my hand in the presence of two subscribing witnesses.

ELIZA ESTELLE McNAUGHTON.

Witnesses:
C. M. LATHROP,
D. P. LESTER.